(No Model.)
F. KUBEC.
MECHANICAL MOVEMENT.
No. 291,745. Patented Jan. 8, 1884.
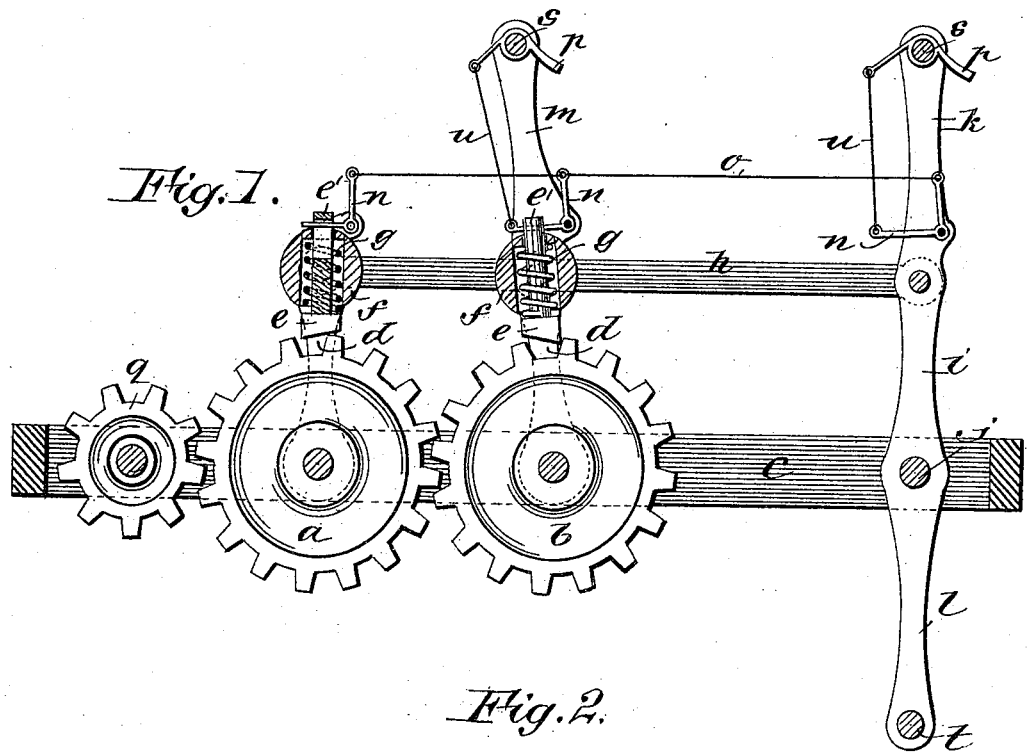
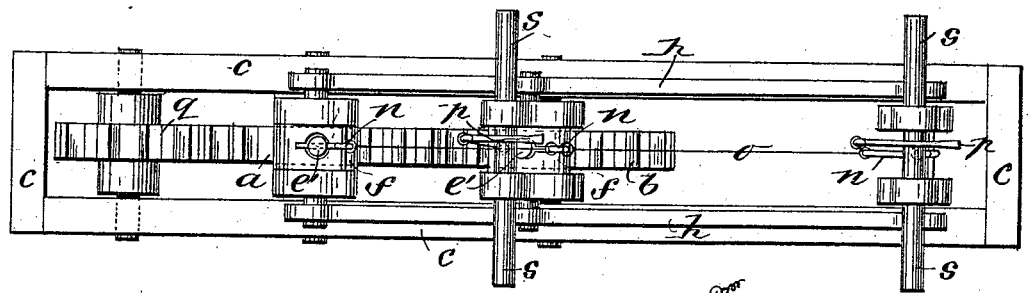
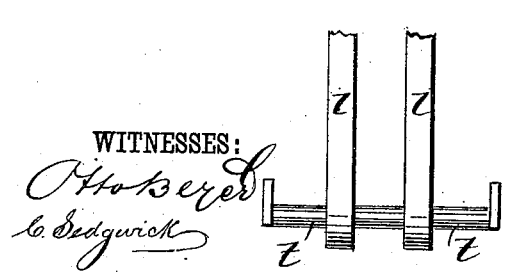
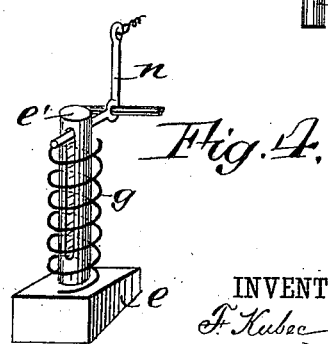
WITNESSES:
Otto Berger
C. Sedgwick
INVENTOR:
F. Kubec
BY Munn & Co
ATTORNEYS.

UNITED STATES PATENT OFFICE.

FREDERICK KUBEC, OF RIVERSIDE, IOWA.

MECHANICAL MOVEMENT.

SPECIFICATION forming part of Letters Patent No. 291,745, dated January 8, 1884.

Application filed November 6, 1883. (No model.)

*To all whom it may concern:*

Be it known that I, FREDERICK KUBEC, of Riverside, in the county of Washington and State of Iowa, have invented a new and Improved Mechanical Movement, of which the following is a full, clear, and exact description.

My invention consists of an improved lever-and-pawl device combined with a pair of toothed wheels geared together, and so arranged that continuous rotary motion is communicated to the wheels, one pawl acting on one of the wheels when the lever moves in one direction, and another pawl acting on the other wheel when the lever moves the other way, and said wheels driving in the same direction, but turning in opposite directions, all as hereinafter fully described.

Reference is to be had to the accompanying drawings, forming part of this specification, in which similar letters of reference indicate corresponding parts in all the figures.

Figure 1 is a sectional elevation of my improved apparatus. Fig. 2 is a plan view, and Figs. 3 and 4 are details.

I gear a couple of spur-toothed wheels, $a$ and $b$, together in any suitable frame, $c$, and arrange a pawl-lever, $d$, and pawl $e$ with each wheel for turning it, the pawls being set to drive in opposite directions and to act on the teeth of the wheels for driving them. The pawls are formed on the ends of short rods $e'$, that are fitted to the sockets $f$ of the pawl-levers for being worked by them, and they rise and fall in said sockets to pass over and drop into the teeth for working the wheels, the springs $g$ in said sockets forcing the pawls down. The pawl-levers $d$ are connected to a working-bar, $h$, which is to be reciprocated by power applied to it in any approved way—say by a lever, $i$, pivoted to the frame $c$ at $j$ for a fulcrum, and having one arm, $k$, to be worked by hand, and another arm, $l$, to which power may be applied at the same time by the feet; or said lever may be worked either by hand or feet independently. One or both of the pawl-levers may have an arm, $m$, by which the power may be applied by hand, the lever $i$ being dispensed with. The pawls $e$ are connected to trip-levers $n$, to be used for raising the pawls out of contact with the wheels, when it may be required, to enable the working-lever to be shifted to any one point more favorable than another for starting the machine, and said trip-levers are connected to a rod, $o$, to be worked together by a hand-lever, $p$, on the power-lever, when it may be worked at the same time that the hands are employed on the power-lever, said hand-lever being connected to any one of the trip-levers by a rod, $u$, or other equivalent device. The pawl-stems $e'$ are slotted for the arms of the trip-levers $n$, to enable the pawls to rise, by their reverse movement, over the teeth of the wheels $a\ b$, without affecting said trip-levers.

The power may be transmitted from the wheels $a\ b$ by a pinion, $q$, geared with either one or by the shaft of either wheel.

The connecting-rod $h$ may be made any length desired, according to the distance the driving-gear may require to be located from the working-lever $i$.

The power-lever $i$ or $m$ may be worked by a steam-engine or other reciprocating driver.

An important feature of the device is that the power may be applied by long or short strokes, which may be varied within a considerable range, according to the number of teeth the pawls may be made to take at each operation. The leverage of the transmitting-gear may thereby be varied, according as the labor is heavy or light, the driving-power being arranged to shift along the working-lever at will toward and from the fulcrum of said working-lever. The working-levers may have handles $s$ and foot-pieces $t$, by which to work them to advantage, and the connecting-bar $h$ may be in duplicate for more substantial arrangement than a single bar affords.

Having thus described my invention, what I claim as new, and desire to secure by Letters Patent, is—

1. The combination of a working-lever and two reversely-acting pawls and pawl-levers with a pair of toothed wheels, $a\ b$, geared together, said pawl-levers being connected to the working-lever, substantially as described.

2. The trip-levers $n$ and a hand-lever, $p$, combined with the pawls $e$, pawl-levers $d$, and pair of toothed wheels *a b*, said wheels being geared together and the pawls being reversely arranged, substantially as described.

3. The pawl-stems *e'* and springs *g*, arranged in the sockets *f* of the pawl-levers *d*, in combination with wheels *a b* and trip-levers *n*, said pawl-stems being slotted for the connection of the trip-levers *n* with them, substantially as described.

FREDERICK KUBEC.

Witnesses:
W. H. CRESS,
A. J. CARR.